United States Patent
Ruiz et al.

(10) Patent No.: US 10,828,617 B2
(45) Date of Patent: Nov. 10, 2020

(54) REACTOR FOR THE HYDROTHERMAL OXIDATION TREATMENT OF AN ORGANIC MATERIAL IN A REACTION MEDIUM

(71) Applicant: COMMISSARIAT A L'ENERGIE ATOMIQUE ET AUX ENERGIES ALTERNATIVES, Paris (FR)

(72) Inventors: Jean-Christophe Ruiz, Laudun L'Ardoise (FR); Hubert-Alexandre Turc, Les Angles (FR); Antoine Leybros, Bagnols sur Ceze (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 16/468,067

(22) PCT Filed: Dec. 14, 2017

(86) PCT No.: PCT/FR2017/053558
§ 371 (c)(1),
(2) Date: Jun. 10, 2019

(87) PCT Pub. No.: WO2018/109390
PCT Pub. Date: Jun. 21, 2018

(65) Prior Publication Data
US 2020/0276555 A1    Sep. 3, 2020

(30) Foreign Application Priority Data
Dec. 16, 2016  (FR) ..................................... 16 62611

(51) Int. Cl.
*B01J 19/00* (2006.01)
*B01J 3/00* (2006.01)
(Continued)

(52) U.S. Cl.
CPC .......... *B01J 19/0066* (2013.01); *B01J 3/008* (2013.01); *B01J 4/001* (2013.01); *B01J 19/0013* (2013.01);
(Continued)

(58) Field of Classification Search
CPC ................ B01J 19/0066; B01J 19/0013; B01J 19/1812; B01J 19/1843; B01J 3/008;
(Continued)

(56) References Cited

U.S. PATENT DOCUMENTS

2017/0056852 A1    3/2017  Ruiz

FOREIGN PATENT DOCUMENTS

CN      102659232 A     9/2012
FR      2814967 A1      4/2002
(Continued)

OTHER PUBLICATIONS

French Search Report for Application No. 1662611 dated Jul. 31, 2017.
(Continued)

*Primary Examiner* — Lessanework Seifu
(74) *Attorney, Agent, or Firm* — Pearne & Gordon LLP

(57) ABSTRACT

A reactor for treating an organic material in a reaction medium by hydrothermal oxidation, comprising: a longitudinal body provided with a cold interface flange; an inner tube, positioned in the body to form an annular area and comprising a cold end and a hot end, the inner tube delimiting an internal reaction area in fluid communication with the annular area via an opening provided in the hot end of the inner tube; blades for stirring the reaction medium situated in the internal reaction area and mounted rotating about the longitudinal axis of the body; a sleeve for injecting
(Continued)

organic material to be treated into the inner tube. The inner tube is mounted rotating on the cold flange, so as to be rotated about the longitudinal axis; the sleeve being positioned inside the inner tube, having a bore that defines a passage for the organic material to be treated to pass.

10 Claims, 3 Drawing Sheets

(51) Int. Cl.
    *B01J 19/18*     (2006.01)
    *B01J 4/00*     (2006.01)

(52) U.S. Cl.
    CPC ...... *B01J 19/1812* (2013.01); *B01J 2204/002* (2013.01); *B01J 2204/007* (2013.01); *B01J 2219/00779* (2013.01); *B01J 2219/1943* (2013.01)

(58) Field of Classification Search
    CPC .............. B01J 4/001; B01J 2219/00779; B01J 2219/1943; B01J 2204/002; B01J 2204/007
    See application file for complete search history.

(56) References Cited

FOREIGN PATENT DOCUMENTS

| | | |
|---|---|---|
| WO | 9302969 A1 | 2/1993 |
| WO | 0230836 A1 | 4/2002 |
| WO | 2007036512 A1 | 4/2007 |
| WO | 2014111581 A1 | 7/2014 |

OTHER PUBLICATIONS

International Search Report for PCT/FR2017/053558 dated Mar. 7, 2018.
Written Opinion for PCT/FR2017/053558 dated Mar. 7, 2018.

REACTOR FOR THE HYDROTHERMAL OXIDATION TREATMENT OF AN ORGANIC MATERIAL IN A REACTION MEDIUM

CROSS-REFERENCE TO RELATED APPLICATIONS

This is the National Stage application of PCT international application PCT/FR2017/053558, filed on Dec. 14, 2017, which claims the priority of French Patent Application No. 16 62611, filed Dec. 16, 2016, both of which are incorporated herein by reference in their entireties.

TECHNICAL FIELD

The field of the invention is that of the hydrothermal or wet oxidation treatment of an organic material.

The invention finds application in particular in the destruction of organic materials such as liquid hazardous industrial waste such as, for example, halogen solvents, toxic organic effluents, pharmaceutical, biological or contaminated effluents, and/or solid hazardous industrial waste (for example Ion Exchange Resins (IER)).

STATE OF PRIOR ART

HydroThermal Oxidation (HTO) and Wet Oxidation (WO) enable, by means of pressurised high temperature water, and in the presence of an oxidant, organic materials (such as for example halogen or non-halogen organic effluents, having a high or not high Lower Heating Value (LHV)) to be fully or partially decomposed. The oxidant can be air, pure oxygen, in gas or liquid form, or further be, for example, oxygenated water (hydrogen peroxide).

The mixture of oxidant and water, solubilising the organic material, is made in a reactor (also called an autoclave) kept at a temperature between 400 and 550° C. for the HTO, thus forming a single phase homogeneous mixture. It is under these conditions that the organic material is oxidised. In the case of WO, the reactor is kept at a temperature lower than the water critical temperature (374° C.), generally between 150 and 325° C., and at a pressure between 20 and 175 bar.

The supercritical medium oxidation technique has first been implemented within a reactor having a simple tubular geometry. This geometry turned out to be efficient from the reaction point of view, but very limited when treating halogen compounds because of corrosion phenomena occurring at the walls, as well as of the deposition of mineral compounds causing the formation of plugs.

To solve these corrosion and salt accumulation problems, it has been proposed (documents [1], [2] and [3]) to use a stirred continuous double jacket reactor, illustrated in FIG. 1.

The reactor 13 includes a tubular shaped blind main body 1 withstanding the operating pressure and temperature, which is closed by a sealing flange 2 kept cold by an active cooling. The main body 1 of the reactor has two very distinct zones, namely a zone kept at an operating temperature 11 by independent heating means and a zone kept cold 12 by independent cooling means.

An inner tube 3 is located inside the main body 1 and is kept sealed at the cold flange 2. This inner tube 3 delimits a reaction zone 9, located inside the inner tube, and an annular zone 10, included between the extrados of the inner tube and the inner wall of the main body 1. The inner tube 3 fluidly communicates, on the side of the warm zone (operating temperature), the reaction zone 9 with the annular zone 10 through at least one aperture 14.

The inner tube 3 is not subjected to a pressure mechanical stress and confines the HTO or WO reaction in the reaction zone 9. This containment is both made statically, because of the presence of the inner tube 3 which forms a screen for the reaction zone 9, and dynamically, because of the fluid circulation upon operating the reactor. This inner tube 3 is designed to withstand the chemical aggressions induced by the reaction and can be readily replaced by disassembling its coupling to the cold flange 2. This inner tube also provides the counter-current heat exchanger function between the reagents to be preheated (oxidant+water) and warm fluids from the reaction zone. Thus, the reagents necessary to the HTO or WO reaction (oxidant+water) are fed at the operating flow rate via the cold flange 2 and circulate in the annular zone 10 up to the warm end of the reactor, and then penetrate the reaction zone 9. In this place, the reagents (oxidant+water) encounter organic materials which are injected at the operating flow rate at a simple tubular fed point 7 located at the warm end of the reactor. The material treated exits the reaction zone through an outlet 8.

A stirring means equivalent to a turbine 4, comprising a shaft provided with blades, is located in the inner tube. The shaft is rotated by an external electric motor 5. The stirring means enable the reaction mixture to be homogenised and facilitates heat transfers between the reaction zone 9 and the wall of the inner tube 3. The turbine 4, as for the inner tube 3, are made of a material withstanding the chemical aggressions induced by the reaction and axial temperature gradients along the reactor. This stirring means can readily be replaced by disassembling the cold flange 2.

There are also heating means and cooling means provided:

- outside the main body 1 of the reactor at atmospheric pressure, through heating resistors (for example, heating collars) or iced water circulation double jackets (documents [1] and [2]);
- inside the main body 1 of the reactor, at the operating pressure, through resistors or coolant circuits dipped in the annular zone and sufficiently close to the reaction zone, while being protected from aggressions by the inner tube 3 (document [3]).

These reactors of prior art can however be further improved. These reactors have in particular the following limitations.

The use of an inner tube 3 involves the presence of an annular zone under almost balanced pressure with the reaction zone 9. This configuration enables a volume protected from chemical aggressions induced by the HTO or WO reaction to be delimited. A fluid consisting of water and oxidant (also called a "process fluid") runs through this volume, which fluid is warmed by heat exchange with the fluid from the reaction, on the one hand (in the intrados of the inner tube), and by independent heating means, on the other hand (heating collars external to the wall of the main body 1 of the reactor). In documents [1], [2] and [3], the process fluid is used as a coolant, which allows a heat transfer from the extrados of the inner tube towards the surface of a heat exchanger dipped in the annular zone or towards the surface of the wall of the reactor main body.

The flow of this process fluid is made at a feed flow rate required by the needs of the HTO or WO reaction, which can result in a very low-turbulence flow. On the other hand, if under the supercritical temperature conditions of water, this and the possibly gaseous oxidant, such as air or dioxygen, form a homogeneous mixture, the same is not true under the subcritical temperature conditions encountered in the cold zone of the reactor. Therefore, it is not excluded that a separation of the liquid and gas phases occurs in the annular zone at a low temperature, resulting in a flow stratification, the aqueous phase being placed at the lower part and the gas phase at the upper part. Thereby, it would be desirable to be able to act on the flow regime in the annular zone, independently of the feed flow rate required by the reaction.

Besides, the circuitry used to feed the reactor with organic material to be decomposed (cold waste) undergoes, under the operating pressure and temperature conditions, mechanical stresses, in addition to temperature cycles during reactor starting and shutting down phases. It is thus necessary, if it is desired to have a proper seal over time, to change this circuitry on a regular basis.

Furthermore, the cold waste fed flow rates being relatively low with respect to other reactor inflows and outflows, this feed is generally made using a very low diameter tubing. Yet, since the oxidant is generally not present in this tubing, it is subject to clogging by waste pyrolysis.

The concept of the continuous stirred double jacket reactor has been widely used for various continuous or semi-continuous WO and HTO applications. Some applications involving compounds including heteroatoms such as S, P, CI can cause, under long-duration operating conditions, significant damage for the inner tube 3 and the stirring means 4, and more particularly on a region located on the shaft of the stirring means, located in a so-called supercritical/subcritical transition zone. The bending forces undergone by the stirring means are further important in this particular region. This region of the shaft is thus the subject of a combination of mechanical, thermohydraulic, or even thermogalvanic effects, in addition to the conventional general corrosion and deposit corrosion phenomena. This combination induces a weakness of the device, which can result in more frequent maintenances under some operating conditions.

DISCLOSURE OF THE INVENTION

The invention aims at improving a continuous stirred double jacket reactor of the prior art, in particular by allowing a control of the flow regimen in the reactor core, independently of the water (reaction medium) and cold oxidant (air, pure oxygen . . . ) feeding flow rate.

To that end, the invention aims in particular at improving the efficiency of the heat transfers (heating and cooling) by acting on the stirring of the reaction medium, as well as on the introduction of the waste in the reaction zone.

Thus, the invention relates to a reactor for the hydrothermal oxidation treatment of an organic material in a reaction medium (which can be a supercritical medium), comprising:
a main body extending along a longitudinal axis, being provided at a first one of its ends with a cold interface flange, sealing means being disposed between the main body and the flange;
an inner tube placed inside the main body so as to form an annular zone along the main body, the inner tube comprising a cold first end sealingly contacting with the cold flange, and a warm second end, the inner tube delimiting a reaction internal zone which is in fluid communication with the annular zone through at least one aperture disposed in the warm end of the inner tube;
a stirring means for agitating the reaction mixture located in the reaction internal zone of the inner tube, said stirring means being rotatably mounted about the longitudinal axis;
a refrigerating means for cooling an effluent (which contains the treated organic material) located in the reaction internal zone of the inner tube before being discharged from the reactor through an outlet of the main body;
an inlet for a water-oxidant mixture located on the side of the cold first end of the main body, the water-oxidant mixture running through the annular zone from the cold first end to the warm second end of the inner tube, before penetrating the reaction internal zone of the inner tube;
an effluent outlet located at the cold first end of the main body;
an injection means for injecting the organic material to be treated in the inner tube;
the reactor being characterised in that the inner tube is rotatably mounted to the cold flange, so as to be rotatably driven about the longitudinal axis;
in that the injection means includes a sleeve, placed inside the inner tube, said sleeve having a first end which is sealingly attached to the cold flange and a second end which is located in the proximity of the warm end of the inner tube, the sleeve further having a bore which defines a passageway of the organic material to be treated from the first end to the second end of the sleeve; and
in that the stirring means comprises a plurality of blades attached to the inner wall of the inner tube and spaced apart from each other along a longitudinal direction of the inner tube, the blades being rotatably driven by the rotation of the inner tube, and a plurality of counter-blades attached to the outer wall of the sleeve and spaced apart from each other along a longitudinal direction of the sleeve.

It is to be noted that the contact between the cold first end of the inner tube and the cold flange is a contact allowing both sealing and rotation of the inner tube, since the inner tube is sealingly mounted with the cold flange, but should also be able to rotate.

The blades and counter-blades of the stirring means enable shearing of the stirred fluid contained in the reaction zone to be improved.

Some preferred but not limiting aspects of this reactor are the following ones.

Advantageously, the stirring means further comprises a rotating shaft which is disposed in the reaction internal zone of the inner tube and which passes through the cold flange, the rotating shaft being housed in the bore of the sleeve of the injection means. The internal diameter of the bore and the external diameter of the rotary shaft are of course chosen so as to enable the organic material to be treated to pass from the first end to the second end of the sleeve. In this preferred configuration of the invention, there is stirring of the reaction zone, the annular zone and the passageway of the organic material in the bore of the sleeve at the same time.

According to the invention, the inner tube is rotatably mounted about the longitudinal axis of the main body and belongs to the rotation means. When the rotation means further includes a rotating shaft, different configurations are possible. The rotation of the inner tube and that of the rotating shaft can be independent, each being rotatably driven about the longitudinal axis by its own motor. A single motor can also be used to rotatably drive both the inner tube and the rotating shaft by connecting it either to the inner tube, or to the rotating shaft and by making the rotating shaft integral with the inner tube.

The stirring means can further include a plurality of blades attached to the outer wall of the inner tube and spaced apart from each other along the longitudinal direction of the inner tube. That makes it possible to act on the flow regime in the annular zone, independently of the feeding flow rate required for the HTO or WO reaction.

The sleeve can further include, on its outer wall, at least one radially projecting disc. That enables the reaction volume to be divided into a succession of at least two perfectly stirred elementary reactors, the average flow of which tends to the piston-like flow.

The refrigerating means can include a heat exchanger forming a cold loop radiator, this heat exchanger being disposed in the annular zone in the proximity of, preferably contacting with, the cold flange. That enables the effluent of the reaction zone to be cooled by limiting the resistances to heat transfer between this effluent and the cold loop.

The reactor can further include a plurality of glove fingers, disposed in the annular zone and passing through the cold flange. These glove fingers make it possible to approach as close as possible the reaction zone, by ensuring a maximum heat transfer between this reaction zone and these glove fingers. Different devices which will aid in conducting (providing or extracting localised heat power) and monitoring (localised temperature follow-up instrumentation) the HTO or WO reaction can further be inserted in these glove fingers. In both cases, by "localised" it is meant a longitudinal localisation along the axis of the reaction zone, along which the heat power exchange requirements and the temperature measurement accuracy differ. The glove fingers can thus be provided with heating cartridges enabling heat power to be injected into a defined portion of the length of the reaction zone, or further be provided with measurement devices enabling one or more temperature points to be measured at accurate positions along the reaction zone.

The heat exchanger forming a cold loop radiator can be an annular element which is coaxial with the inner tube. This annular element can be provided with channels, each channel defining a passageway for a glove finger; this configuration has the advantage of being compact, while enabling the end of the glove fingers which is connected to the cold flange to be kept cold (that enables thermal bridges to be limited and the cold flange to be protected).

The reactor can further comprise a heat exchanger forming a warm loop radiator, obtained by circulating a coolant in contact with the outer wall of the main body. This heat exchanger forming a warm loop radiator can for example be formed by at least one groove provided in the outer wall of the main body and in which a coolant is circulated. That can also be a serpentine, in which a coolant is circulated. Preferably, the groove or the serpentine extends on a surface of the outer wall of the main body of the reactor extending at least from the warm second end of the main body flush with the refrigerating means; the groove or the serpentine can for example extend helically about the longitudinal axis of the main body or even extend longitudinally with respect to the longitudinal axis of the main body making successive round trips.

The stirring means can further comprise an annular geometry piece provided with a bore, which is coaxial with the bore of the sleeve and which defines a passageway for the rotating shaft, as well as a fixed counter-blade which connects the piece to the second end of the sleeve. The piece has preferably an external diameter identical, within a slip clearance, to that of the sleeve, this piece playing the role of a rotatable support bearing.

The reactor can further comprise a double jacket, which is kept at a pressure lower than or equal to 300 mbar (the double jacket is thus kept under primary vacuum or under a strong depression) and which is disposed about the main body (which is brought to high temperature) and in contact with the cold flange. This double jacket plays the role of a heat insulator. That is made possible by the fact that fluid feeding and discharging circuitries have been bonded to the cold flange. This double jacket allows a thermal bridge breakage about the warm zone of the main body and can also provide a thermal insulation of this warm zone.

The inner tube can include a plurality of apertures disposed in the warm end of the inner tube.

The invention has many advantages. The improvements provided make it possible in particular:
- to be able, at a given reaction volume, to significantly increase the continuous treatment ability of low to high LHV organic material;
- to efficiently extract the heat power output from the oxidation reaction of the organic material to transfer it to a secondary circuit and value it;
- to improve instrumentation possibilities as close as possible to the reaction;
- the HTO thermal control independently of the process fluid feeding conditions;
- to ensure a continuous efficient cooling of the HTO reaction products;
- to increase the equipment availability by decreasing the time necessary to maintenance (in particular, necessary changes of the inner tube and stirring means are less frequent).

BRIEF DESCRIPTION OF THE DRAWINGS

Further aspects, purposes, advantages and characteristics of the invention will better appear upon reading the following detailed description of preferred embodiments thereof, given by way of non-limiting example, and made in reference to the appended drawings in which.

DETAILED DISCLOSURE OF PARTICULAR EMBODIMENTS

Figure 2:
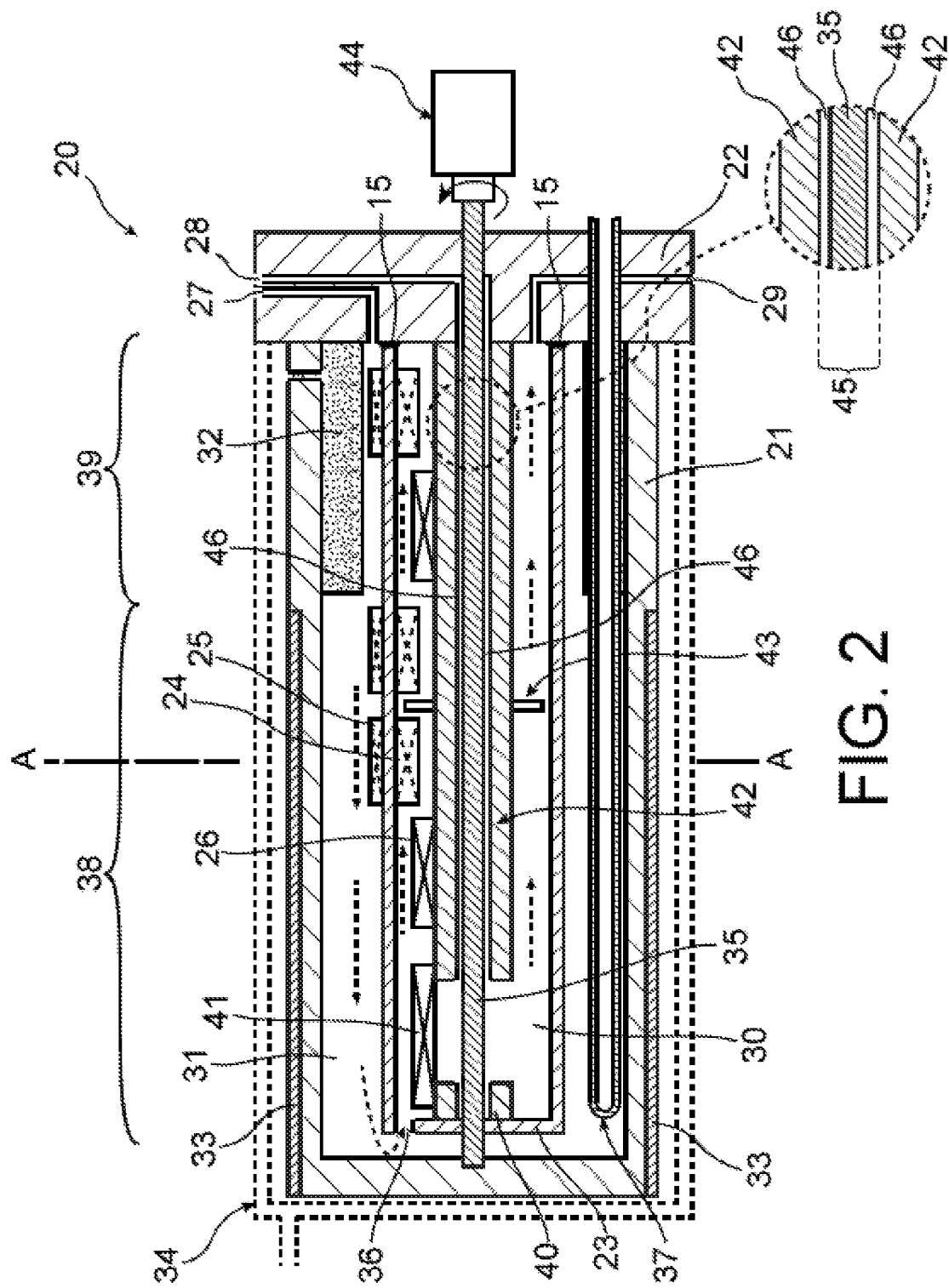
FIG. 2 represents a cross-section view of one embodiment of a reactor according to the invention.

In FIG. 2, a schematic view of a reactor according to one preferred embodiment of the invention is represented.

The reactor 20 includes:
- a longitudinal main body 21 provided at a first one of its ends with a cold interface flange 22, sealing means (not represented) being disposed between the main body 21 and the flange 22;
- an inner tube 23 placed inside the main body 21 so as to form an annular zone 31 along the main body, the inner tube 23 comprising a cold first end sealingly contacting with the cold flange 22, and a warm second end, the inner tube 23 delimiting a reaction internal zone 30 which is in fluid communication with the annular zone 31 through at least one aperture 36 disposed in the warm end of the inner tube 23;

a stirring means for agitating the reaction medium located in the reaction internal zone 30 of the inner tube 23, said stirring means being rotatably driven through a rotating shaft 35 disposed in the reaction internal zone 30 of the inner tube 23 and passing through the cold flange 22, which is rotated by an actuator 44;

a refrigerating means 32, which is located in the annular zone 31 in contact with the cold flange 22, which enables an effluent present in the reaction zone 30 to be cooled before being discharged from the reactor through the outlet 29;

an inlet 27 for a water-oxidant mixture located on the side of the cold first end of the main body 21, in the cold flange 22, the water-oxidant mixture running through the annular zone 31 from the cold first end to the warm second end of the inner tube 23, before penetrating the reaction internal zone 30 of the inner tube through at least one aperture 36;

an effluent outlet 29 located at the cold first end of the main body 21, in the cold flange 22;

an injection means for injecting the material to be treated in the inner tube from the waste feed 28 located in the cold flange 22.

According to the invention, the tube 23 is a rotating tube. In the embodiment illustrated in FIG. 2, the tube is integral with the shaft 35 and is rotatably driven by the rotation of the shaft 35. According to another embodiment not illustrated, the tube, integral with the shaft, could be rotated by an outer actuator and rotatably drive the shaft.

The reactor 20 further comprises a fixed sleeve 42 provided with a bore in which the shaft 35 is housed.

According to the invention, stirring enabling the reaction mixture to be agitated in the reaction zone 30, that is the water-oxidant-waste mixture, from the waste injection point up to flush with the refrigerating means 32 located in the annular zone 31, is not obtained, as in prior art, by rotating a turbine 4 with respect to the inner tube 3, but by rotating the inner tube 23 itself with respect to a surface of the inner wall of the main body 21, on the one hand, and with respect to an outer surface of the sleeve 42 located inside the inner tube 23, on the other hand. The presence of blades 25 on the extrados of the rotating inner tube further enables stirring of the water-oxidant mixture to be achieved in the annular zone 31, which stirring was not ensured in prior art.

The rotating inner tube 23 should have a proper resistance to static stresses, buckling, bendings and torsions. It is made of a suitable material having a determined resistance, which is chosen as a function of the corrosion damage induced by the chemical composition of the organic material to be treated, as well as by the HTO or WO reaction. The inner tube will generally be made of titanium. Further, the inner tube has a large diameter (to enable in particular blades 24 and counter-blades 26, 41 to be inserted inside the tube).

This rotating tube 23 is sealingly mounted to the cold interface flange 22. To make rotatable sealing of the tube 23 on the cold flange 22, two planar surfaces with a rotatable slip, which surfaces are called grains 15, are for example used. The grain sealing can be made, for example, by a compression force adjustable by means of a spring not represented in FIG. 2. The rotating tube 23 enables the annular zone 31 to be fluidly communicated with the reaction zone 30 (dynamic containment of the HTO or WO reaction) at the warm part (operating temperature zone 38) of the reactor 20. This fluid communication is here made by means of several apertures 36 made in the warm end of the tube and the function of which is to generate several turning jets of water/warm air mixture injected into the reaction zone. The turning jets have the function of assisting the mixture of water/air/solvent reagents, which enables the HTO or WO reaction to be initiated and completed.

In FIG. 2, a configuration in which the rotating tube 23 is rotatably driven by rotating the shaft 35, which is integral with the inner tube 23 at the warm end of the main body 21 of the reactor is represented. At the cold flange 22, this rotating shaft 35 is rotated by a mechanical device which is proof to the operating pressure, for example by using a magnetic drive moved by an external electric motor (external actuator 44). The internal and external volumes of the inner tube 23 are under almost balanced pressure because the volumes are fluidly communicated at the operating temperature zone 38 of the reactor, where the fluid implemented is for example a solute mixture in supercritical water the viscosity of which is low. The grains have thus a sealing to be made with a small pressure gradient, but for a hydrostatic operating pressure that can range from ambient pressure to pressures very much higher than the water critical pressure.

The rotating tube 23 is provided with blades 24 (for example fins) which are welded to its intrados (its inner wall) and arranged on the entire length of the tube. Counter-blades 26 (for example fins) are welded to the extrados (outer wall) of the fixed waste injection sleeve 42. The blades 24 and the counter-blades 26 are, for example, disposed in a staggered fashion. The implementation of stirring by means of the blades 24 (moved by rotating the inner tube 23), and by the presence of the fixed counter-blades 26, enables the shearing of the stirred fluid contained in the reaction zone to be improved.

In FIG. 2, the fixed sleeve 42 is a cylindrical bar having a bore 45 (port) which enables the motor shaft 35 to pass therethrough; one end of the fixed sleeve 42 is sealingly integral with the cold flange 22. As illustrated in the magnification of FIG. 2 or in FIG. 3, the clearance between the diameter of the bore of the fixed sleeve 42 and the diameter of the motor shaft 35 forms an injection volume 46 in which the cold waste is injected at the cold waste feed inlet 28, which is now located on the cold flange 22. This injection volume 46 is continuously moved, independently of the waste feeding flow rate, by the relative displacement between the surface of the motor shaft 35 and the inner surface of the fixed sleeve 42. Since the waste is fed at the base of the shaft in the cold flange 22, the waste thus runs through the injection volume 45 from the cold end to the warm end of the reactor and is gradually preheated by heat exchange with the reacted warm fluid, from the reaction zone 30. Further, the waste is kept under stirring in this injection volume 45, because of the permanent presence of a shear force between the fixed sleeve 42 and the rotating shaft 35. This introduction mode thus tolerates the possible waste pyrolysis, as well as the presence of suspended solid particles in the waste injected, and thus limits build-up in this zone of deposits tending to clog the injection.

The sleeve 42 is dimensioned such that its warm end comes in the operating temperature zone 38 of the reactor 20, but this end can come at a more or less important distance from the warm end of the inner tube 23. In order to limit the flexion between both ends of the fixed sleeve 42, the warm end of the sleeve 42 can be supported by a system associated with the stirring function. Herein, this support system includes a cylindrical piece 40 provided with a bore which is coaxial with the bore 45 of the fixed sleeve 42, the piece 40 having preferably an external diameter identical to that of the sleeve 42; the support system further includes a fixed counter-blade 41, which is integral both with the sleeve 42 and the piece 40.

Figure 1:
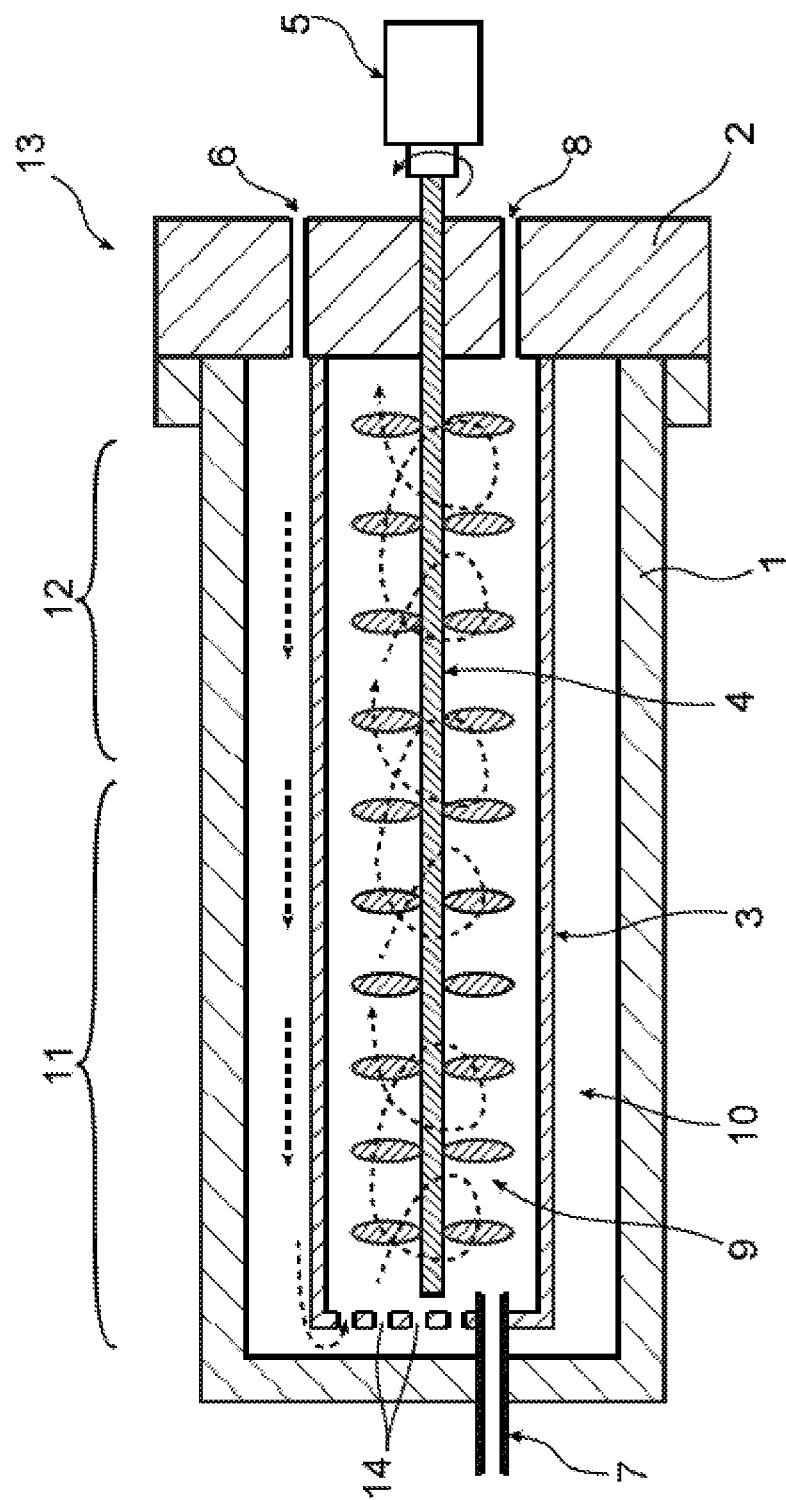
FIG. 1, already described, represents a cross-section view of a continuous stirred double jacket reactor according to prior art.

This association of rotating blades 24 and fixed counter-blades 26, 41 enables stirring and radial mixing conditions in the reaction volume to be improved, relative to the configuration of prior art illustrated in FIG. 1.

The fixed sleeve 42 can also be provided with one or more discs 43 (a single disc is represented in FIG. 2), evenly distributed or not (according to the configuration retained) along the longitudinal axis of the sleeve. This (these) disc(s) enable(s) axial mass transfer to be limited; the reaction volume thus forms a succession of perfectly stirred elementary reactors, the average flow of which tends to the piston-like flow.

Advantageously, as represented in FIG. 2, the rotating inner tube 23 is further provided on its extrados (outer wall) with blades 25 (for example fins), which are welded on its entire length, the blades 25 being longitudinally spaced apart from each other. The blades 25, as the blades 24, are moved by rotating the inner tube 23. It is set out that the radial dimensioning of the blades 24, 25 and the counter-blades 26, 41 is adapted as a function of the available space. The blades 25 face elements (glove fingers 37 (a single of which is represented in FIG. 2) as well as, for some of them, to the cold exchanger 32) which make up fixed obstacles; therefore, they have a lower radial dimension than the blades 24.

Figure 3:
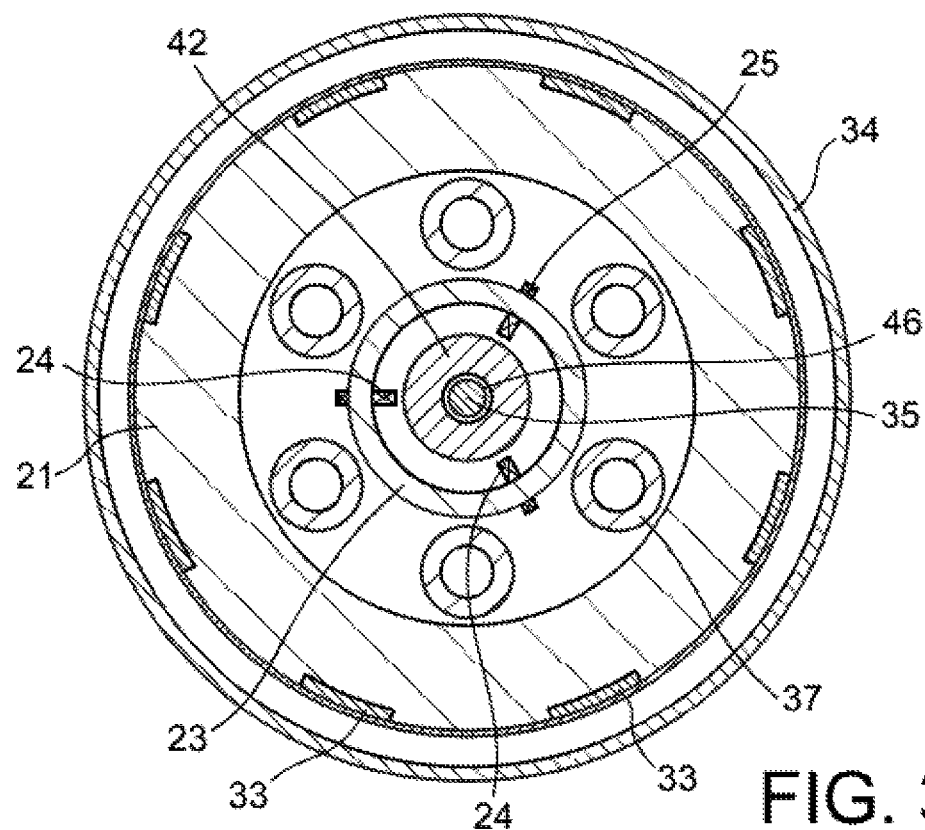
FIG. 3 represents a cross-section view along line A-A of FIG. 2.

According to the embodiment illustrated in FIG. 3, the reactor includes three sets of blades 24 (attached to the intrados of the inner tube 23), three sets of blades 25 (attached to the extrados of the inner tube 23) and three sets of counter-blades 26 (attached to the extrados of the sleeve 42 and not represented in FIG. 3).

The blades 24 and 25, and the counter-blades 26 and 41 aid in:
  improving the heat transfer by playing on the flow hydrodynamics in the annular zone 31 and in the reaction zone 30;
  increasing the heat exchange area between the reaction medium and the annular zone 31 by creating a secondary exchange surface.

Finally, the improved stirring means, in association with the improved introduction means for the organic material to be treated, enable the waste to be quickly dispersed in the reaction medium, which results in an improved efficiency of the heat transfers (heating and cooling). More particularly, the improved stirring means enables, on the one hand, the mixing of the reagents to be improved throughout the reaction zone and thus to ensure the absence of dead zones and, on the other hand, improving heat exchanges between the reaction zone and the annular zone, as well as between the annular zone and the glove fingers, which allows a better control of reactivity of the medium and the local operating conditions (limiting local heatings for example).

Further, unlike the configurations of prior art, waste introduction is no longer made at the reactor warm end, but at its cold end and through the cold flange 22. The waste feed 28 is implemented internally to the reactor 20 through the fixed injection sleeve 42, sealed and integral with the cold flange 22 of the reactor 20 and directly opening into the reaction zone 30. Likewise, as will be seen below, the temperature measurement, cooling and heating of the reactor 20 are made through the glove fingers 37. Thus, according to the preferred embodiment of the invention, all the connections ensuring sealing under pressure of the reactor which were located in the proximity of the HTO reaction zone or under temperature have been removed, regardless of whether it concerns injection or fluid extraction or measurements (temperature, pressure). Any risk of low seal at these connections are thus avoided and the resistance to the mechanical stress of these connections are improved under the operating conditions.

In FIG. 2, a single glove finger 37 is represented. A glove finger 37 is an element well known to those skilled in the art: this is a blind sleeve, forming a protective housing for receiving a system which can for example be a heating system, a temperature measuring system or even a system for extracting thermal power. The function of the glove finger 37 is to preserve sealing of the reactor 20 at the operating pressure and temperature, while leaving the system it contains at atmospheric pressure.

In the present invention, the glove fingers 37 are disposed in the annular zone 31 of the reactor 20, parallel to the containment inner tube 23 and are inserted through an aperture provided in the cold flange 22 of the reactor.

The use of the glove fingers 37 for preheating and temperature follow-up is configurable. It is thus possible, by way of examples, to dedicate some glove fingers to heating, to position the heating zones at specific places located flush with the reaction zone 30, to instrument more or less finely the temperature follow-up along the reactor 20, to add thermal power extraction means (cold exchangers, as will be seen below) through cooling pins 47.

According to a preferred embodiment of the invention, at least one of the glove fingers 37 of the reactor 20 is equipped with a heating cartridge type heating system, for example a heating cartridge with a high calorific value. Injection of heating power is thus achieved in immediate proximity of the reaction zone 30. As the heating system is inserted outside the containment tube 23 (and thus off the reaction zone 30), it is not exposed to aggressions from the HTO reaction.

The heating cartridge inserted in a glove finger 37 allows:
  quick heating and starting the HTO reaction from a cold reactor;
  starting the HTO reaction under difficult conditions (low-LHV solvent), by heating water/oxidant fluids before mixing and initiating the HTO reaction at the reaction zone 30, in the case where the operating conditions set do not enable the spontaneous ignition of the WO reaction to be stably achieved;
  maintaining minimum temperature operating conditions required for developing the WO or HTO reaction expected in the reaction zone throughout this reaction zone.

It is however to be noted that the heating efficiency relies on the efficiency of the heat exchange between the glove fingers 37 and the process fluid contained in the annular zone 31, in particular on the forced stirring which is implemented in the annular zone 31.

The heating cartridge technology enables the thermal power production to be positioned on some specific lengths on the reactor 20 and an adapted temperature read-out and a specific regulation to be associated therewith. In these technologies, the heating cartridges, also called heating pencils or shielded cylindrical resistors, can be in a tubular form of different diameters and very various lengths. The cartridges dissipate relatively high power densities on all or part of their total length. For example, these powers can reach 60 $W \cdot cm^{-2}$ for maximum temperatures in the order of 800° C.

It is possible for example to equip the reactor with six glove fingers 37 and to insert three heating cartridges into three of the six possible glove fingers, in order to deliver a thermal power homogeneously distributed on a warm length of the reactor from the cold exchanger 32 (excluded) up to flush the waste/water/oxidant mixing zone in the reaction zone 30. Each cartridge can be provided with a thermocouple for its regulation and an independent thermocouple enabling the absence of overheating of the glove finger in which it is placed to be controlled. The glove fingers should in particular respect a limit temperature as a function of the material chosen to make them up and guarantee their mechanical characteristics. For example, in the case of Inconel™ 625, a material widely used in hydrothermal oxidation, this limit temperature is 700° C.

A glove finger can also contain a system for measuring the temperature prevailing in the zone 31 which, because of stirring, is much representative of the temperature field prevailing in the reaction zone 30.

According to an alternative embodiment, one of the six glove fingers can be dedicated to the placement of a series of thermocouples placed as a bundle enabling the temperature along the glove finger to be measured. As well as for the heating cartridges, the insertion of the temperature measuring system into a glove finger enables the functions of the measuring system that the glove finger contains (here the remote temperature measurement) and holding said system under pressure to be dissociated. Thus, the thermocouples are not to be crimped at the cold flange 22.

The use of a bundle of thermocouples enables an important number of temperature measuring points distributed on the reactor length to be simply and very configurably acquired (ready choice for positioning the temperature readout). These measuring points can:
contribute to driving the HTO or WO reaction;
enable the temperature operating domain of the reactor to be monitored.

The sensitivity of the temperature measurement is essentially a function of the quality and kinetics of the heat exchange between the glove fingers 37 and the process fluid contained in the annular zone 31, and in particular the forced stirring which is implemented in the annular zone.

In order to manage the power output from the HTO reaction at high solvent feeding flow rate, it is preferable to utilise efficient heat management pieces of equipment which make it possible to gain one degree of freedom for conducting these pieces of equipment under harsh conditions (high-LHV solvent). To that end, the inventors have chosen to improve the means for controlling the power output from the HTO reaction.

Heat exchangers forming a warm loop radiator (also called a "warm exchanger") are used, which have the purpose of recovering the excess thermal power (heat) output from the HTO reaction to an outer circuit, which enables the temperature to be homogenised in the reaction zone 30 and the temperature at which the pressurised reactor 20 is exposed to be limited.

Figure 4:
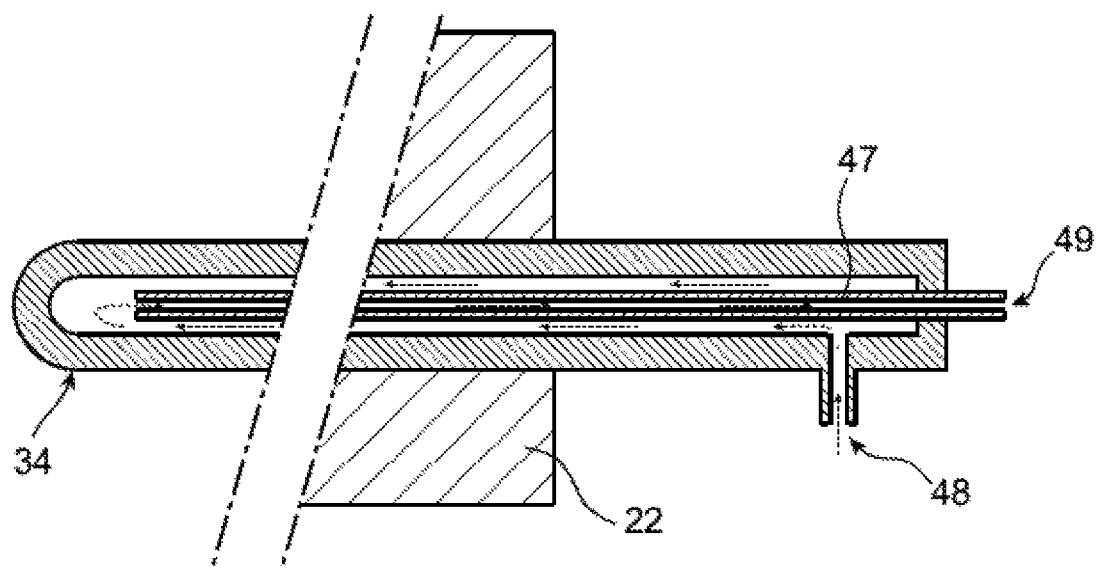
FIG. 4 represents, according to a cross-section view, a detail of FIG. 2, in which a glove finger 37 can be noticed in a configuration suitable for making heat power extraction of the warm zone, by means of a cooling pin 47.

As represented in FIG. 2, the homogeneity and temperature limitation are ensured in the two following ways:
a warm exchanger type heat exchanger 33 is inserted in the outer wall of the main body 21 of the reactor 20 from its cold end to the warm end of the cold exchanger 32. This heat exchanger 33 is for example made from a grooving made in the outer wall of the main body 21 of the reactor and making successive round trips along the longitudinal axis of the reactor on the entire surface of the reactor (FIG. 3), a coolant circulating in the groove thus made;
a warm exchanger type heat exchanger in the form of a pin 47, as represented in FIG. 4, which is inserted in the reactor as close to the reaction as possible by means of a glove finger 37. A coolant is introduced through a fluid inlet 49 in the pin; this fluid circulates in the glove finger 37 and comes out through a fluid outlet 48. This heat exchanger in the form of a pin 47, located flush with the reaction zone in one or more glove fingers 37, contributes to improving the thermal control of the HTO reaction.

The circulation of a coolant in these heat exchangers enables the thermal power to be efficiently extracted. The coolant used is, for example, SuperCritical $CO_2$ or even supercritical water. This circulation enables the temperature of the reactor pieces of equipment and reaction volume to be controlled, in order to drive the kinetics of the HTO or WO reaction by limiting the pyrolysis formation and preserving the materials possibly subjected to extreme temperatures.

The coolant circulation flow rate can be controlled by the maximum temperature accepted at the inner wall of the main body 21 of the reactor and read out in a measuring glove finger 37. This alternative is not detailed.

Whatever the warm exchanger type heat exchanger used, it can be fed with coolant at a continuous flow rate controlled by a temperature measurement located as close as possible to the reaction. The coolant can be vaporised at atmospheric pressure in the heat exchanger or be pressurised.

A heat exchanger forming a cold loop radiator (also called a "cold exchanger"), can further be used, which enables combustion reaction products to be continuously cooled with the complementary use of an outer circuit of water refrigerated at atmospheric pressure. As illustrated in FIG. 2, this cooling function is ensured by a cold exchanger type heat exchanger 32 which is compact and is inserted in the reactor 20 in the annular zone 31 at the cold end of the reactor and which will enable to have a cooled zone 39 in the reactor. The cold exchanger 32 is thus protected from aggressions of the HTO or WO reaction by the containment tube 23. The insertion of the cold exchanger 32 at the core of the fluid circulating in the annular space 31 enables the efficiency of heat exchanges to be significantly increased and thus its bulk to be reduced, thus enabling the reaction volume to be maximised. The cooling efficiency however relies on the heat exchange efficiency between this cold exchanger 32 and the process fluid contained in the annular zone 31, and in particular on the forced stirring which is implemented in the annular zone.

The main function of the cold exchanger 32 is to ensure a continuous cooling of the reaction products, at the operating pressure, using a circuit at atmospheric pressure. This component thus works with an external pressure which is equal to the operating pressure and an internal pressure which is lower. The insertion of this cold exchanger 32 in the main body of the reactor thus implies a resistance of its walls to a compression mechanical stress and not a tensile stress, which enables it to be made in a standard material and with thin wall thicknesses, thus making a heat transfer easier.

In the configuration illustrated in FIG. 2, the cold exchanger 32 has an annular shape and is pressed against the inner wall of the main body 21 of the reactor at the cold flange 22. It further includes channels enabling glove fingers 37 to pass therethrough. The heat exchanger 32 thus also enables heat conduction to be limited along the glove fingers 37 passing therethrough, from the warm reaction zone 30 in which they are dipped to the cold flange 22 to which they are sealingly connected.

By choosing, on the one hand, to implant on the cold side of the reactor, all the pressurised connections and, on the other hand, to internalise the heating means, the space of the warm end of the reactor has been cleared. The substantially entire length of the reactor can be fully dedicated to the reactor temperature management. The reactor temperature management is in particular ensured by the heat exchanger 33 already described above, which is disposed on the external surface of the main body of the reactor and the function of which is thermal power extraction.

It is acquired that a thermal insulation by external heat insulation already used in prior versions can be utilised. However, this insulation type can raise handling difficulties in a confined space and waste management.

The purpose of this heat insulation is quadruple:
- to limit heat losses in order to enable temperature conditions of the HTO or WO reaction to be reached in the reaction zone;
- to limit heat losses in order to limit air heating in the periphery of the reactor, in particular upon operating in a confined space;
- to limit the temperature of the outer wall of the main body of the reactor at a temperature acceptable under some constrained operating conditions;
- to limit heat losses in order to concentrate power extraction by a dedicated coolant circuit, that can maximise valuing of the excess combustion energy released by the HTO or WO reaction.

As illustrated in FIG. 2, the heat insulation of the reactor is further improved by the presence of a double jacket 34, which is preferably in the form of a blind sleeve, delimiting a cavity for housing the main body of the reactor, integral with the cold flange 22. The double jacket 34 is kept at a pressure as low as possible, or even at a high vacuum, to limit air conductive and convective transfers at the periphery of the reactor. Preferably, the extrados of this jacket 34 and the extrados of the main body 21 of the reactor are treated, for example, by chromium plating to limit radiative transfers. The double jacket 34, once installed and depressurised, forms an insulator in a similar way as a Dewar flask.

This double jacket 34 can be supplemented by an external cooling (not represented in FIG. 2), in the case where the temperature of the outer wall of the double jacket would be too high or the heat loss would be too detrimental for keeping ambient temperature about the reactor. In the latter case, the jacket under vacuum ensures an important thermal bridge breakage and a simple metal serpentine attached to the outside of the jacket enables criteria required by constrained operating conditions to be maintained.

REFERENCES CITED

[1] WO 02/30836 A1
[2] WO 2007/036526 A2
[3] WO 2014/111581 A1

What is claimed is:

1. A reactor for hydrothermal oxidation treatment of an organic material in a reaction medium, comprising:
    a main body extending along a longitudinal axis, being provided at a first one of its ends with a cold interface flange, sealing means being disposed between the main body and the flange;
    an inner tube placed inside the main body so as to form an annular zone along the main body, the inner tube comprising a cold first end sealingly contacting with the cold flange, and a warm second end, the inner tube delimiting a reaction internal zone which is in fluid communication with the annular zone through at least one aperture disposed in the warm end of the inner tube;
    a stirring means for agitating the reaction mixture located in the reaction internal zone of the inner tube, the stirring means being rotatably mounted about the longitudinal axis;
    a refrigerating means for cooling an effluent located in the reaction internal zone of the inner tube before being discharged from the reactor through an outlet of the main body;
    an inlet for a water-oxidant mixture located on the side of the cold first end of the main body, the water-oxidant mixture running through the annular zone from the cold first end to the warm second end of the inner tube, before penetrating the reaction internal zone of the inner tube;
    an effluent outlet located at the cold first end of the main body;
    an injection means for injecting the organic material to be treated in the inner tube;
    wherein the inner tube is rotatably mounted to the cold flange, so as to be rotatably driven about the longitudinal axis;
    wherein the injection means includes a sleeve, placed inside the inner tube, the sleeve having a first end which is sealingly attached to the cold flange and a second end which is located in the proximity of the warm end of the inner tube, the sleeve further having a bore which defines a passageway of the organic material to be treated from the first end to the second end of the sleeve; and
    wherein the stirring means comprises a plurality of blades attached to the inner wall of the inner tube and spaced apart from each other along a longitudinal direction of the inner tube, the blades being rotatably driven by the rotation of the inner tube, and a plurality of counter-blades attached to the outer wall of the sleeve and spaced apart from each other along a longitudinal direction of the sleeve.

2. The reactor according to claim 1, wherein the stirring means further comprises a rotating shaft which is disposed in the reaction internal zone of the inner tube and which passes through the cold flange, the rotating shaft being housed in the bore of the sleeve of the injection means.

3. The reactor according to claim 1, wherein the stirring means further comprises an annular geometry piece provided with a bore, which is coaxial with the bore of the sleeve and which defines a passageway for the rotating shaft, as well as a fixed counter-blade which connects the piece to the second end of the sleeve.

4. The reactor according to claim 1, wherein the stirring means further comprises a plurality of blades attached to the outer wall of the inner tube and spaced apart from each other along the longitudinal direction of the inner tube.

5. The reactor according to claim 1, wherein the sleeve further includes, on its outer wall, at least one radially projecting disc.

6. The reactor according to claim 1, wherein the refrigerating means includes a heat exchanger forming a cold loop radiator, this heat exchanger being disposed in the annular zone in the proximity of, preferably contacting with, the cold flange.

7. The reactor according to claim 1, further comprising a plurality of glove fingers, disposed in the annular zone and passing through the cold flange.

8. The reactor according to claim 1, wherein, the refrigerating means including a heat exchanger forming a cold loop radiator, this heat exchanger being disposed in the annular zone in the proximity of, preferably contacting with, the cold flange, and the reactor further comprising a plurality of glove fingers, disposed in the annular zone and passing through the cold flange, the heat exchanger forming a cold loop radiator is an annular element which is coaxial with the inner tube and which is provided with channels, each channel defining a passageway for a glove finger.

9. The reactor according to claim 1, further comprising a heat exchanger forming a warm loop radiator, obtained by circulating a coolant in contact with the outer wall of the main body.

10. The reactor according to claim 1, further comprising a double jacket, which is kept at a pressure lower than or equal to 300 mbar and which is disposed about the main body and in contact with the cold flange.

* * * * *